(No Model.)
J. J. CARTY.
TELEPHONE TRANSMITTER FROM SECONDARY BATTERIES.
No. 518,392. Patented Apr. 17, 1894.
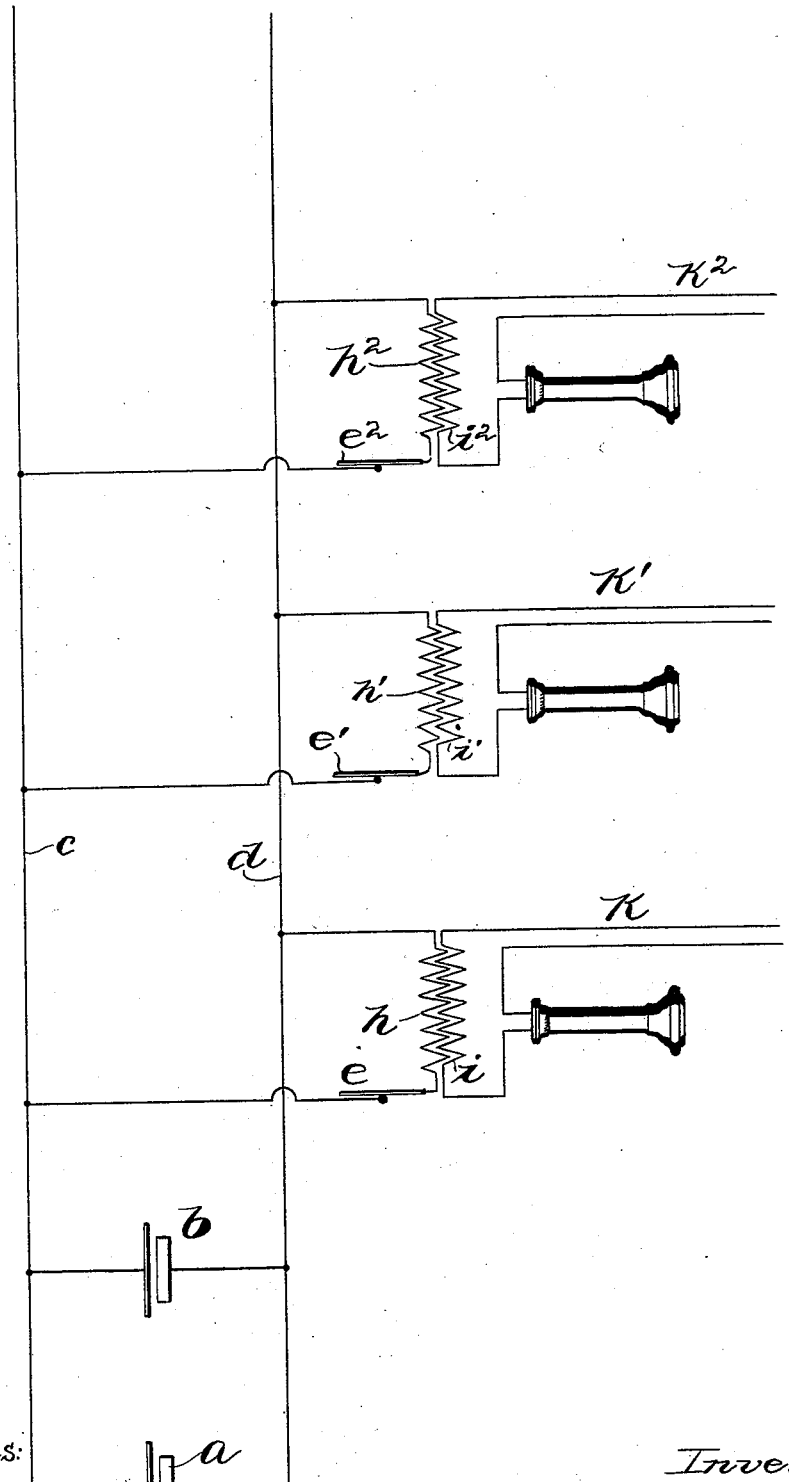
Witnesses:
George L. Cragg
W. Clyde Jones.
Inventor:
John J. Carty.
By Barton & Brown
Attorneys.

UNITED STATES PATENT OFFICE.

JOHN J. CARTY, OF NEW YORK, N. Y., ASSIGNOR TO THE WESTERN ELECTRIC COMPANY, OF CHICAGO, ILLINOIS.

TELEPHONE-TRANSMITTER FROM SECONDARY BATTERIES.

SPECIFICATION forming part of Letters Patent No. 518,392, dated April 17, 1894.

Application filed April 14, 1891. Renewed November 7, 1893. Serial No. 490,318. (No model.)

*To all whom it may concern:*

Be it known that I, JOHN J. CARTY, a citizen of the United States, residing at New York, in the county of New York and State of New York, have invented a certain new and useful Improvement in Telephone-Transmitters from Secondary Batteries, (Case No. 11,) of which the following is a full, clear, concise, and exact description, reference being had to the accompanying drawing, forming a part of this specification.

My invention relates to telephone exchange apparatus, and its object is to provide means whereby two or more transmitters may be simultaneously supplied with current from a common battery without interfering one with another. This result I accomplish by connecting the several transmitters in parallel between the poles of a battery of extremely low internal resistance, preferably one or more cells of storage battery connected in parallel. Such arrangement of the transmitters effects a considerable saving in the first cost of and the attention required by the local transmitter battery, and insures equality in the performances of the various transmitters.

Heretofore attempts have been made to operate several transmitters from a common primary battery, but all such attempts have been more or less unsuccessful, for reasons which are easily perceived. Consider two telephone transmitters with their induction coils connected in parallel to the poles of a battery whose internal resistance is considerable in proportion to that of a transmitter's circuit. A voltage will be established between the poles of the battery, which will bear the same ratio to the total electro motive force of the battery that the joint resistance of the transmitters bears to the total resistance of the circuit. This proportion is readily deduced from the fact that by Ohm's law the current is equal to the electro-motive force of the battery divided by the total resistance of the circuit, and also to the voltage of the battery at the poles divided by the external resistance of the circuit; from the equality of these two ratios it will be seen that the voltage between the poles of the battery will bear the same ratio to the electromotive force of the battery that the external resistance of the circuit bears to the total resistance. If, now, the resistance of one transmitter be increased, as by a motion of its diaphragm, both the external resistance and the total resistance will be increased, but the external resistance will be increased more in proportion than the total resistance, so that to maintain the ratio the voltage at the poles of the battery must be increased, and, consequently, the result of increasing the resistance of one of the transmitters is that the voltage between the battery poles will at once be increased until the ratio again obtains; but this increase of voltage will cause an increase in the current flowing through the other transmitter and its induction coil, thus producing a disturbance in its telephone. But it is obvious that if, as provided in my invention, the resistance of the battery be very low as compared with the resistance of the external or transmitter circuit, the ratio of the resistance of the external circuit to total resistance will remain approximately constant, even though considerable change takes place in the external resistance. The internal resistance of the battery being so low, and the drop of potential due thereto being so small, the change of voltage of the battery due to changes of the ratio of internal to external resistance will be so small as to be practically inappreciable, and, consequently, the voltage of the battery remaining practically constant at all times, one transmitter cannot affect the transmitter in a parallel branch, and no disturbance of other transmitters results. Obviously this extremely low internal resistance of the battery might be obtained by employing a large number of cells of primary batteries connected in parallel, but such a battery would be no less troublesome and cumbersome than in the present arrangement.

In the accompanying drawing, which is illustrative of my invention, I have represented at *a*, *b*, two secondary batteries connected in parallel to two mains *c*, *d*, and between these latter, a group of telephone transmitters *e e'*, &c. In each of the parallel branches is also included the primary *h* of the transmitter induction coil, while the secondaries *i i'*, &c., of the induction coils are included in the several telephone lines $k\ k'$. The battery cells $a\ b$ and the mains $c\ d$ are of very low resistance; and it is by virtue of the low resistance of the circuit external to the transmitters, that I am enabled to operate the several transmitters $e\ e'$ from the common battery $a\ b$ without any sound produced in any transmitter disturbing the perfect operation of any other transmitter. If mains of extremely low resistance cannot be utilized, I connect the terminals of each transmitter directly to the binding posts of the battery.

It is obvious that primary batteries specially constructed for extremely low internal resistance might be employed in place of the secondary batteries $a\ b$ without departing from the substance of my invention; hence I do not limit myself to the employment of storage batteries.

Having thus fully described my invention, I claim as new and desire to secure by Letters Patent—

1. The combination with a battery or other source of electricity, having very low internal resistance, of telephone transmitters connected in parallel between the poles of the battery, and deriving current therefrom, substantially as described.

2. The combination with a storage battery or secondary battery of low internal resistance, of telephone transmitters connected in parallel between its poles, and deriving current therefrom, substantially as described.

3. The combination with a battery or other source of electric current, having very low internal resistance, of several parallel branches between the poles of the battery, and a telephone transmitter and the primary helix of an induction coil in each branch, substantially as described.

4. In combination, a source of electric current of very low internal resistance, separate parallel branches joining the poles of the source of battery, a telephone transmitter and the primary helix of an induction coil included in series in each of the branches, and a telephone line circuit connected with a telephone receiver, including the secondary helix of each induction coil, substantially as described.

In witness whereof I hereunto subscribe my name this 3d day of April, A. D. 1891.

JOHN J. CARTY.

Witnesses:
    JNO. LENIHAN,
    LESTER LELAND.